Nov. 4, 1930.  E. M. DE LONG  1,780,519
INTAKE MANIFOLD
Filed Sept. 24, 1925    2 Sheets-Sheet 1
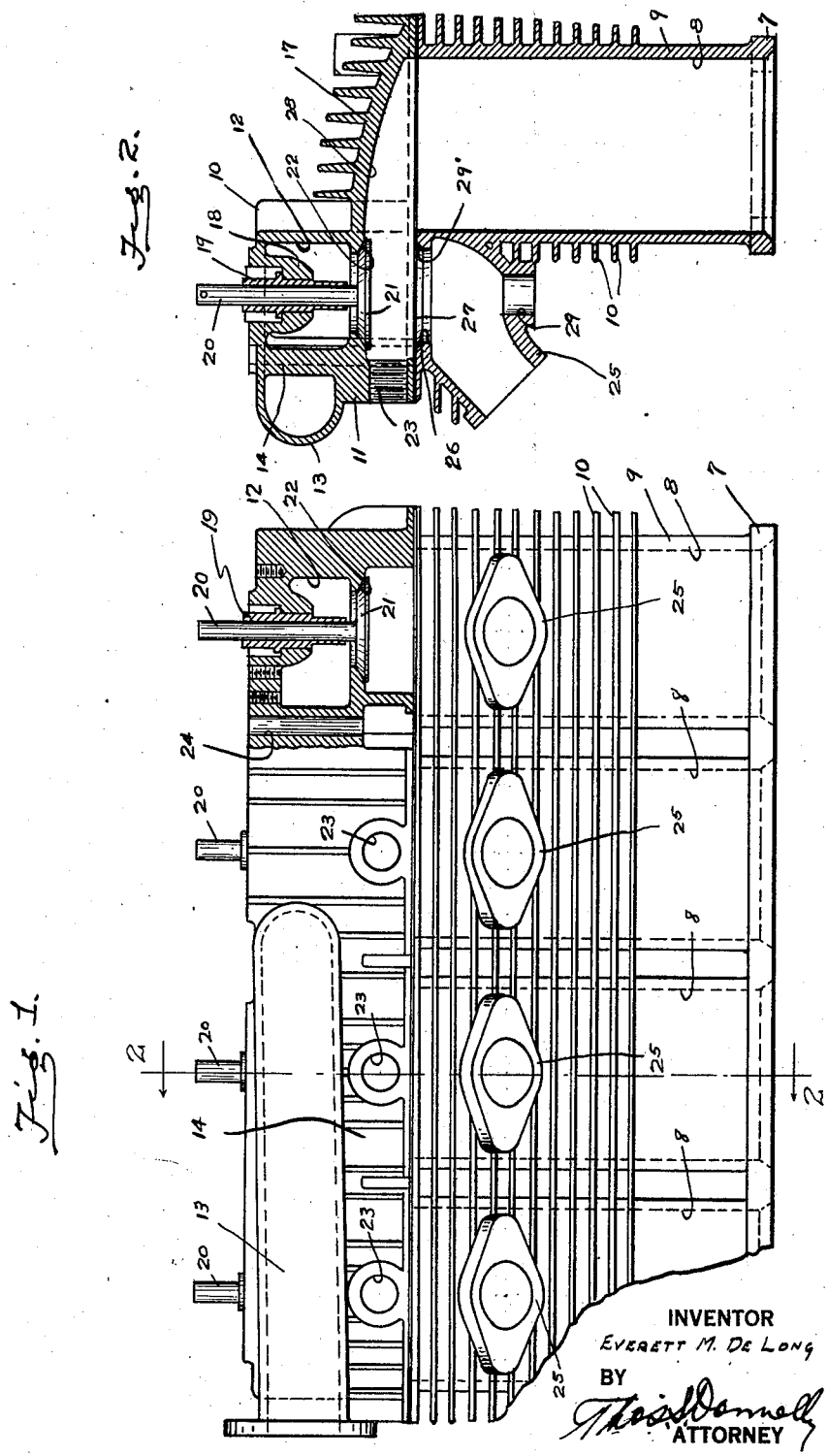
INVENTOR
EVERETT M. DE LONG
BY
ATTORNEY

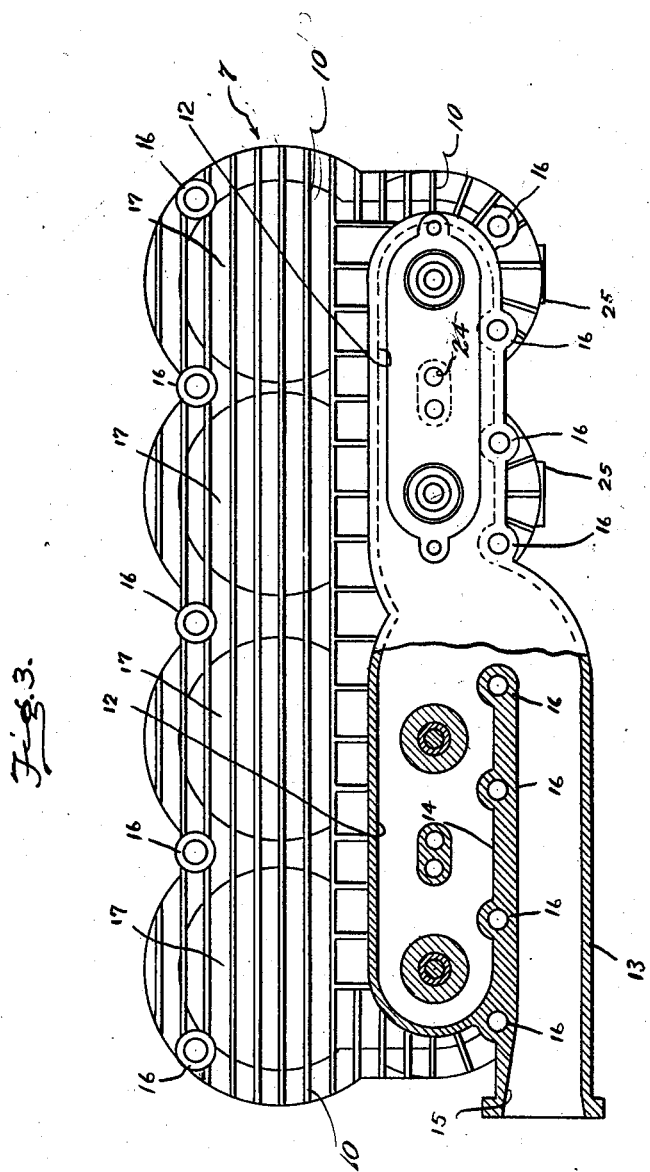

Patented Nov. 4, 1930

1,780,519

UNITED STATES PATENT OFFICE

EVERETT M. DE LONG, OF DETROIT, MICHIGAN

INTAKE MANIFOLD

Application filed September 24, 1925. Serial No. 58,411.

My invention relates to a new and useful improvement in a combination intake manifold and cage unit for internal combustion engines, adapted for use on internal combustion engines generally, but especially adaptable for use on that class of engines which are generally installed on motorcycles.

With such engines there is now commonly used an intake manifold having a main truck provided with a pair of laterally extending branches, each of said branches, where a four-cylinder engine is used, serving as the delivery means for a pair of said cylinders. Many disadvantages are inherent in such an arrangement of intake manifolds, and the efficiency of the engine is considerably lessened, while a compact structure is practically impossible.

In my invention, I have provided an intake manifold which serves to deliver, by one main trunk, the gas into communication with all of the cylinders of the engine, the manifold communicating with a chamber or passageway, which connects with all of the intake ports of the engine. Another feature of the invention is the utilization of the wall of the manifold for heating the gases preliminarily to its delivery into the chamber, which communicates with the intake ports of the various cylinders. This is accomplished by leading the manifold exteriorly of the head and permitting it to discharge into the chamber mentioned, substantially centrally of the head, so that the incoming gases are brought into contact with a wall extending substantially one-half the length of the head, this wall being heated by the exploding gases, as the engine operates. The heating of the gases also serves to cool the engine and makes the present invention practical in conjunction with an air cooled engine. In the present invention, there is also provided a unitary head for use on a multi-cylinder engine, the cylinders being formed in a single block, preferably of cast metal, and provided with radiating fins for cooling purposes. With air cooled engines of this type, it has been customary to form the cylinders separately from each other. Such a structure requires individual heads and cages for the cylinders, with separate gaskets for each cylinder. Such a structure is more expensive to manufacture, less efficient from a manufacturing and practical standpoint than an operative device in which the cylinders are cast in a single block. To provide such a structure, which is operative and free from many of the disadvantages of the multiple structure, is an object of the present invention. To this end, I have provided a head which is unitary and carries with it the valve cage, so that the head serves as a combined manifold and cage. This permits the use of a single gasket between the head and the cylinder block. The specific structure and method of delivering the gas into the head serves to make the device operative in an air cooled engine. In this connection, the heating of the gases serving to cool the engine, prevents distortion and is a desirable feature in this structure for practical purposes. Therefore, the object of the invention is to provide an air cooled multi-cylinder engine having a combined manifold and cage unitary structure, so arranged as to prevent distortion and prove practically operative, while at the same time combining compactness, durability and economy of manufacture.

Other objects will appear hereinafter.

The invention consists in the combination and arrangement of parts hereinafter described and claimed.

The invention will be best understood from a reference to the accompanying drawings, which form a part of this specification and in which, Fig. 1 is a side elevational view of the invention, with a part broken away and with a part in section, Fig. 2 is a sectional view, taken on substantially line 2—2 of Fig. 1, Fig. 3 is a top plan view, showing parts broken away and parts in section.

In the preferred form, as shown in the drawings, there is provided a cylinder block 7, in which are formed a number of cylinders 8, each having a cylinder wall 9. Fins 10 are mounted on the cylinder block for radiating purposes. A head 11 is provided for the cylinder block, this head 11 being provided, substantially throughout its length, with a longitudinally extending passage or chamber 12, with which, at substantially the center thereof, communicates an intake pipe or conduit 13, the wall 14 serving to separate the pipe 13 from the passage 12 at one side. The pipe 13 is provided with a flared end as shown at 15 in Fig. 3. It will also be noted from Fig. 1, that the pipe 13 inclines downwardly. This downward inclination of the pipe or conduit 13 will assist in preventing a flooding, as an excess amount of fuel delivered to the pipe 13 will be permitted to flow back to its source.

The use of the laterally extending branches mentioned above, has as one of its objects, the prevention of flooding, but the device constructed as illustrated, will prevent all flooding under operative conditions. The head 11 is provided with a plurality of openings 16, through which may be projected studs for fastening the head to the block 7. Extending outwardly from the head 11, at one side thereof, so as to cover the cylinders 8, is a combustion chamber forming portion 17. Formed on the head 11 and extending into the chamber 12 is a guide boss 18, in which is positioned, preferably by press fit, a guide sleeve 19 for the reception of the valve stem 20, carrying the valve 21, adapted for engaging the valve seat 22, so as to control communication between the chamber or passage 12, and the space below the valve 21. It is evident that upon opening of the valve 21, the chamber 12 will be in communication with the space or chamber 28, which is positioned over the cylinder 8, so as to permit the entrance of the combustible fuel into the cylinder 8 from the chamber or passage 12. An opening 23 is formed in the head 11 for the reception of the spark plug. As shown in Fig. 1, the head is provided with a passageway 24 for the mounting of the push rod or operating lever, which is designed to operate the valve 21. Exhaust conduits 25 are mounted on the cylinder block and formed preferably integral therewith, these exhaust conduits communicating through the opening 26 with the space beneath the valve 21. A gasket 27 is positioned between the head 11 and the block 7. With this structure a single gasket is used. As shown in Fig. 2, there is provided an opening 29, through which a valve stem may project from the valve, arranged to engage the valve seat 29', this valve being designed to control the exhaust. The valve and its operating structures are not shown as they are of a well known type and form no specific part of this invention.

With such an arrangement, the fuel is delivered into the chamber 12, through the pipe 13, in its passage into this chamber, in coming into contact with the wall 14 and becoming preheated.

It is evident that the heat taken up by the incoming gas will lower the temperature of the wall 14 and assist in cooling. As the gas enters the chamber or passageway 12, it has free access to all of the intake ports of the various cylinders and from practical operation, it has been demonstrated that the structure, as shown, is one which will serve to deliver the fuel to the cylinders uniformly without delivering an insufficient amount to the end cylinders and an excess amount to the centrally positioned cylinder. It is obvious that in assembling this device, a compact structure will be provided and much time saved over the time necessary to assemble the heads and cage units on engines in which the cylinders are formed separately and in which the cage unit is not combined with the manifold.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. In combination with an internal combustion engine having a cylinder block provided with a plurality of cylinders, a unitary head adapted for mounting on said block, said head having a longitudinally extending chamber formed therein, the under surface of said head being spaced from the upper surface of said block throughout the major portion of its area to provide a plurality of chambers each in communication with one of said cylinders, said longitudinal extending chamber communicating with inlet ports with each of said cylinder communicating chambers; an exhaust conduit for each of said cylinders in said block and opening beneath said inlet port into said cylinder communicating chambers; a valve cage mounted on and integral with said head; an intake conduit integral with said head and extending longitudinally thereof throughout substantially one-half its length and communicating with said longitudinally extending chamber, said longitudinally extending chamber lying intermediate the axial line of said intake conduit and said cylinder communicating chambers.

2. In combination with an internal combustion engine having a cylinder block provided with a plurality of cylinders, a head adapted for mounting on said block, said head having a longitudinally extending chamber formed therein, adjacent one side thereof, said head being provided with a plurality of combustion chamber forming portions, each seated over one of said cylinders and spaced upwardly from the end thereof to provide a chamber, each in communication with one of said cylinders, said longitudinally extending chamber communicating through inlet ports with each of said cylinder communicating chambers, said head being provided with an exhaust port opening beneath said inlet port into said cylinder communicating chambers; and an intake manifold on said head, said intake manifold communicating with said longitudinally extending chamber, adjacent its center, said longitudinally extending chamber lying intermediate the axial line of said intake manifold and said combustion chamber forming portions.

In testimony whereof, I have signed the foregoing.

EVERETT M. DE LONG.